US006985436B1

(12) United States Patent
Bhaskar

(10) Patent No.: US 6,985,436 B1
(45) Date of Patent: Jan. 10, 2006

(54) TICKET INSERTION: LOAD INFORMATION FOR ASSURED FORWARDING CLASSES

(75) Inventor: Maruthi Bhaskar, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/457,208

(22) Filed: Dec. 7, 1999

(51) Int. Cl.
*H04J 1/16* (2006.01)
*H04J 3/14* (2006.01)

(52) U.S. Cl. .................................... 370/229; 370/468
(58) Field of Classification Search ............... 370/229, 370/412, 395.4, 395.42, 395.43, 468, 428, 370/235, 400, 230
See application file for complete search history.

(56) References Cited

U.S. PATENT DOCUMENTS

| | | | |
|---|---|---|---|
| 5,926,458 A * | 7/1999 | Yin ........................... 370/230 |
| 5,991,300 A * | 11/1999 | Tappan ....................... 370/392 |
| 5,996,021 A * | 11/1999 | Civanlar et al. ............. 709/238 |
| 6,094,435 A * | 7/2000 | Hoffman et al. ............. 370/414 |
| 6,205,150 B1 * | 3/2001 | Ruszczyk .................... 370/412 |
| 6,331,986 B1 * | 12/2001 | Mitra et al. .................. 370/468 |
| 6,351,465 B1 * | 2/2002 | Han ........................ 370/395.43 |
| 6,363,056 B1 * | 3/2002 | Beigi et al. .................. 370/252 |
| 6,430,155 B1 * | 8/2002 | Davie et al. ................. 370/232 |
| 6,442,138 B1 * | 8/2002 | Yin et al. .................... 370/232 |
| 6,442,165 B1 * | 8/2002 | Sitaraman et al. ........ 370/395.4 |
| 6,483,805 B1 * | 11/2002 | Davies et al. ................ 370/235 |
| 6,501,760 B1 * | 12/2002 | Ohba et al. ............. 370/395.42 |
| 6,556,572 B1 * | 4/2003 | Ishida .................... 370/395.41 |
| 6,597,699 B1 * | 7/2003 | Ayres | |
| 2002/0181485 A1 * | 12/2002 | Cao et al. .................... 370/419 |

OTHER PUBLICATIONS

Heinanen, et al., "Request for Comments: 2597: Assured Forwarding PHB Group," Network Working Group, Jun. 1999.
Blake, et al., "Request for Comments: 2475: An Architecture for Differentiated Services," Network Working Group, Dec. 1998.

* cited by examiner

*Primary Examiner*—Ajit Patel
*Assistant Examiner*—Chirag Shah
(74) *Attorney, Agent, or Firm*—Beyer, Weaver & Thomas

(57) ABSTRACT

Disclosed are methods and apparatus for providing load information for one or more data streams within a network having a plurality of ingress routers, a plurality of core routers, and a plurality of egress routers is disclosed. a plurality of packets are received into a selected ingress router. Each packet belongs to one of several service classes, and the packets are being transmitted to a particular destination. A load value is metered for each service class and the particular destination of at least one of the packets. One or more tickets are periodically transmitted to the destination to indicate the load value for each of the one or more service classes. This load information is then utilized to dynamically allocate load for each service class at the destination.

47 Claims, 6 Drawing Sheets

TICKET INSERTION: LOAD INFORMATION FOR ASSURED FORWARDING CLASSES

BACKGROUND OF THE INVENTION

1. Field of the Invention

The present invention relates to networking technology. More specifically, the invention relates to methods and apparatuses for providing load information.

2. Description of the Related Art

An enhancement to the Internet protocol is described in "Definition of the Differentiated Services Field (DS Field) in the IPv4 and Ipv6 Header" by Nichols et al., Request for Comments 2474, "The Internet Engineering Task Force of the Internet Society," 1998. The entire content of this document is incorporated herein by reference for all purposes. Differentiated services, as the name implies, is a mechanism for providing different types of services to different data flows. For example, one flow may be assigned a larger bandwidth than another flow.

Within the proposed differentiated services scheme there are two types of mechanisms for forwarding packets. The first type is referred to as expedited forwarding (EF). The service emulated by EF is analogous to having a leased line. The second type of forwarding is referred to as assured forwarding (AF). AF includes several relative levels of service.

Each flow is classified into one of several AF classes. For example, the AF classes might include a gold, silver, and bronze class. Each AF class may also be associated with several loss probability levels. Each AF class and loss probability level is forwarded in a different way. For example, flows for the gold class may have a larger bandwidth than flows for the silver class.

Since it is impractical to classify packets at every router along the packet's transmission path (e.g., which path typically includes edge routers and core routers), classification is done by the edge routers. The edge routers typically handle less traffic than the core routers. The edge routers classify incoming packets into one of several predefined classes. In other words, each packet is assigned to one behavior aggregate.

After a packet is classified by an edge router and then routed to a core router, the receiving core routers then merely have to identify the packet as belonging to a particular behavior aggregate and apply the appropriate behavior for that aggregate. In other words, the core router only has to determine the behavior aggregate that was previously assigned by the edge router.

Resources are typically allocated statically for each class. For example, assume that the gold class is assigned a bandwidth usage of 10 Mbps, and the silver class is assigned a bandwidth usage of 5 Mbps. The problem with this scheme is that the actual service that a particular flow sees depends not only on the assigned AF class, but also on the current total load that the AF class is observing. In the above described example, the gold class may have 10 streams that together are consuming 10 Mbps, and the silver class may have 1 stream that is by itself consuming 5 Mbps. Thus, the streams in the gold class each get 1 Mbps of bandwidth, while the silver stream gets 5 Mbps. Of course, each stream of the gold class should ideally be allocated more bandwidth than each stream of the silver class. However, due to the heavy load on the gold class, the streams of the gold class are temporarily short changed.

In view of the foregoing, there is a need for improved methods and apparatuses for providing differentiated services. Specifically, there is a need to provide actual load information for each class so that resources may be more efficiently and reliably allocated to each class.

SUMMARY OF THE INVENTION

Accordingly, the present invention provides an apparatus and method for providing load information for a particular service class. In general terms, load information is determined for each class. The load information is then sent to one or more destinations, and this load information is sent in the form of one or more tickets to the corresponding destination(s). The tickets for a particular destination or set of destinations represent the amount of load that is being received at such destination(s) on a per class basis.

In one embodiment, a method for providing load information for one or more data streams within a network having a plurality of ingress routers, a plurality of core routers, and a plurality of egress routers is disclosed. A plurality of packets is received into a selected ingress router. Each packet belongs to one of several service classes, and the packets are being transmitted to a particular destination. A load value is metered for each service class and the particular destination of at least one of the packets. One or more tickets are periodically transmitted to the destination to indicate the load value for each of the one or more service classes.

In one embodiment, a router is disclosed for implementing the operation of this method. For example, the router is an ingress router. The router includes a memory and a processor coupled to the memory. At least one of the memory and the processor are adapted to provide the operations described above. In another embodiment, the invention pertains to a computer readable medium containing programming instruction for implementing operations of this method.

In another embodiment, a method for allocating resource to one or more data streams within a network having a plurality of ingress routers, a plurality of core routers, and a plurality of egress routers is disclosed. One or more tickets are received into a selected core router. The tickets indicate a total load for each one of a plurality of service classes. Resources are dynamically allocated to a plurality of streams within each service class based on the one or more received tickets.

In one embodiment, a router is disclosed for implementing this method. For example, the router is a core router or an egress edge router. The router includes a memory and a processor coupled to the memory. At least one of the memory and the processor are adapted to provide the operations described above. In another embodiment, the invention pertains to a computer readable medium containing programming instruction for implementing this method.

The present invention has several advantages. For example, once a router (e.g., a core router) acquires load information for the set of classes that it is servicing, the router can then dynamically allocate resources based on the provided load information. For example, the router can dynamically allocate resources for each stream of each class. In fact, the router can do whatever it wants with the provided load information, in addition to allocating resources.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
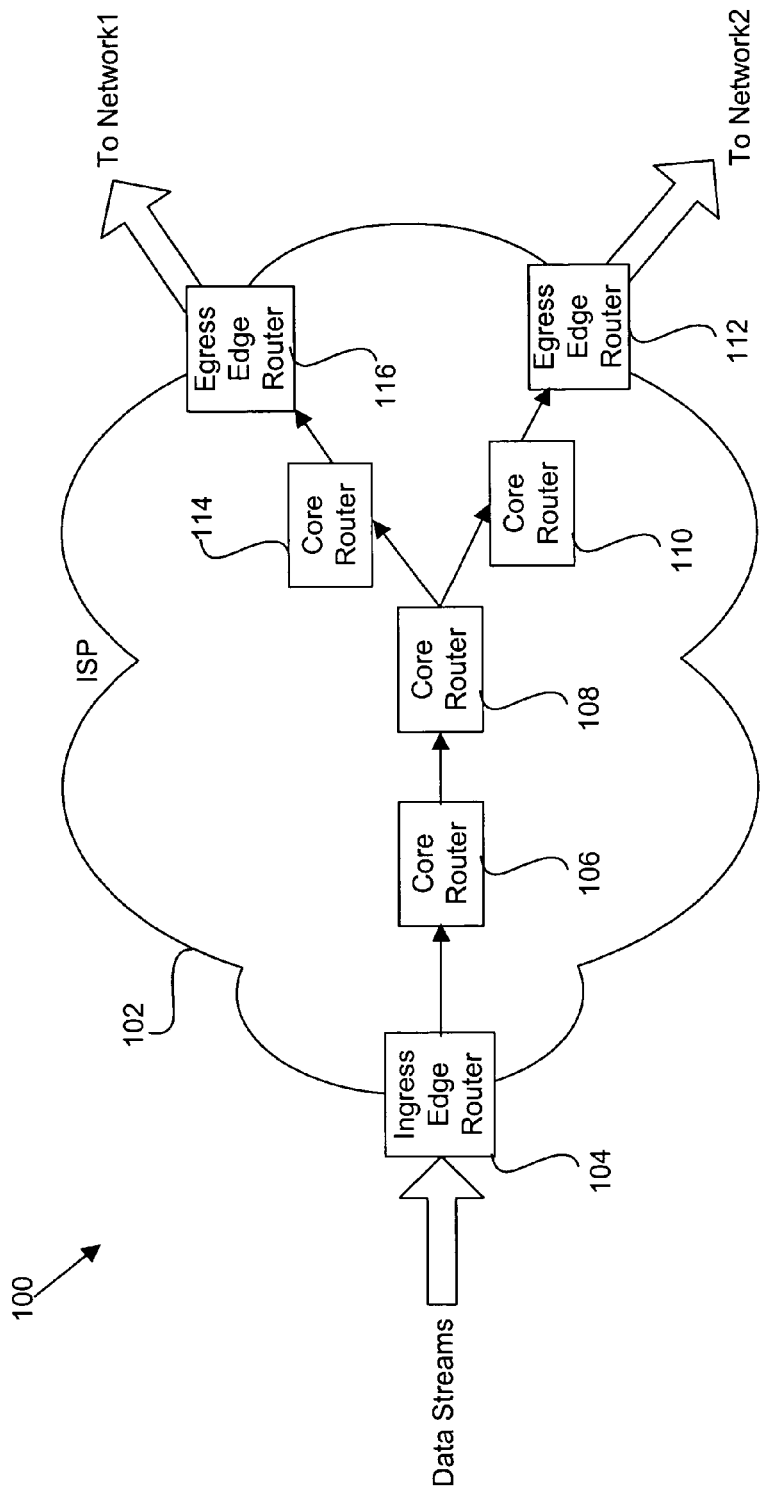
FIG. 1 is a diagrammatic representation of a sub-network in accordance with one embodiment of the present invention.

FIG. 1 is a diagrammatic representation of a sub-network 100 in accordance with one embodiment of the present invention. The sub-network 100 includes a plurality of edge routers (e.g., 104, 112, and 116). An edge router is defined as an ingress edge router when the edge router receives data streams from outside of the sub-network 100. As shown, data streams enter the sub-network 100 via ingress edge router 104. On the other hand, an edge router is defined as an egress edge router when data leaves the sub-network 100 through such edge router. As shown, the sub-network 100 includes a first egress edge router 112 and a second egress edge router 116. Each egress edge router, as well as each ingress edge router, may be coupled to another sub-network. As shown, egress edge router 116 is coupled to a network 1, while egress edge router 112 is coupled to a network 2.

As data moves through network 100, it passes through one or more core routers. A core router generally receives data from an edge router or another core router within the same network and outputs data to another core router or to an edge router within the same network. As shown, core router 106 receives data from ingress edge router 104. The core router 106 then passes the data to core router 108. Core router 108 passes the data to either core router 114 or core router 110. Whether or not data is passed to core router 114 or core router 110 depends on the destination of the data. For example, data that is destined for network 1 will pass to core router 114, while data that is destined for network 2 will pass to core router 110. As shown, core router 114 then passes the data to edge router 116, which router then passes the data to network 1. Likewise, core router 110 passes data to edge router 112, which router than passes the data to network 2.

Each core router may include any number and kind of resources that are utilized to forward the packets towards their intended destinations. For example, each core router has a plurality of forwarding queues that may be utilized to distinguish between classes. In one embodiment, a first queue is used for a gold class; a second queue is used for a silver class; and a third queue is used for a bronze class. The packets from each queue may be forwarded by applying a round-robin scheduling. The number of packets that are selected from a particular queue during a particular round depends on the amount of bandwidth that is assigned to the corresponding class. For example, three packets may be sent from the first class for the gold class; two packets sent for the second queue for the silver class; and one packet sent for the third queue for the bronze class.

Conventionally, when a core router is simply provided with class information for a given stream (e.g., the identity of the class to which the stream belongs), the core router has limited capabilities for managing load between resources. In the above example, if the bronze class has 1 stream and the gold class had 10 streams coming into a particular core router, the single stream of the bronze class ends up with more bandwidth than the streams of the gold class.

The present invention provides mechanisms for determining load information (e.g., the number of streams) for each class that is being received by a particular core router or group of core routers. The core router(s) may utilize this load information to calculate new bandwidth assignments on a per stream basis, for example. That is, the core router may be able to dynamically allocate bandwidth for each stream within each class. The resource allocation can be based on the actual load being utilized by the streams of a given class. An example of such a resource allocation scheme is described below with reference to FIG. 4.

Any suitable mechanisms may be utilized for providing load information to the core routers. In a preferred embodiment, tickets that indicate load information are sent to each core router or a set of core routers. The tickets may contain any suitable information that a core router may utilize to allocate resources to each stream within a particular class. In one embodiment, each ticket represents a unit of load (e.g., a stream) for a particular class. Thus, the core router may count the number of tickets to determine the amount of load for a particular class. In an alternative embodiment, each ticket may represent any amount of load (e.g., the total number of streams) for a particular class.

The ticket(s) may be sent to any suitable destination that may utilize the load information contained in the ticket(s). For example, the tickets are sent to the same destination as the stream(s) that are being represented by the tickets. Alternatively, the tickets are sent to a destination aggregate or a group of core routers. One example of a destination aggregate is an egress router. Although a packet may move through several core routers, the packet typically only passes through a single egress router. If load information that is relevant for a particular egress router is sent to such egress router, the load information will also be received by the core router that is responsible for handling such load (e.g., this core router forwards the corresponding load or streams to such egress router). The core router may utilize the load information to determine the number of packets, for example, from each stream to send to a particular egress router.

Figure 2:
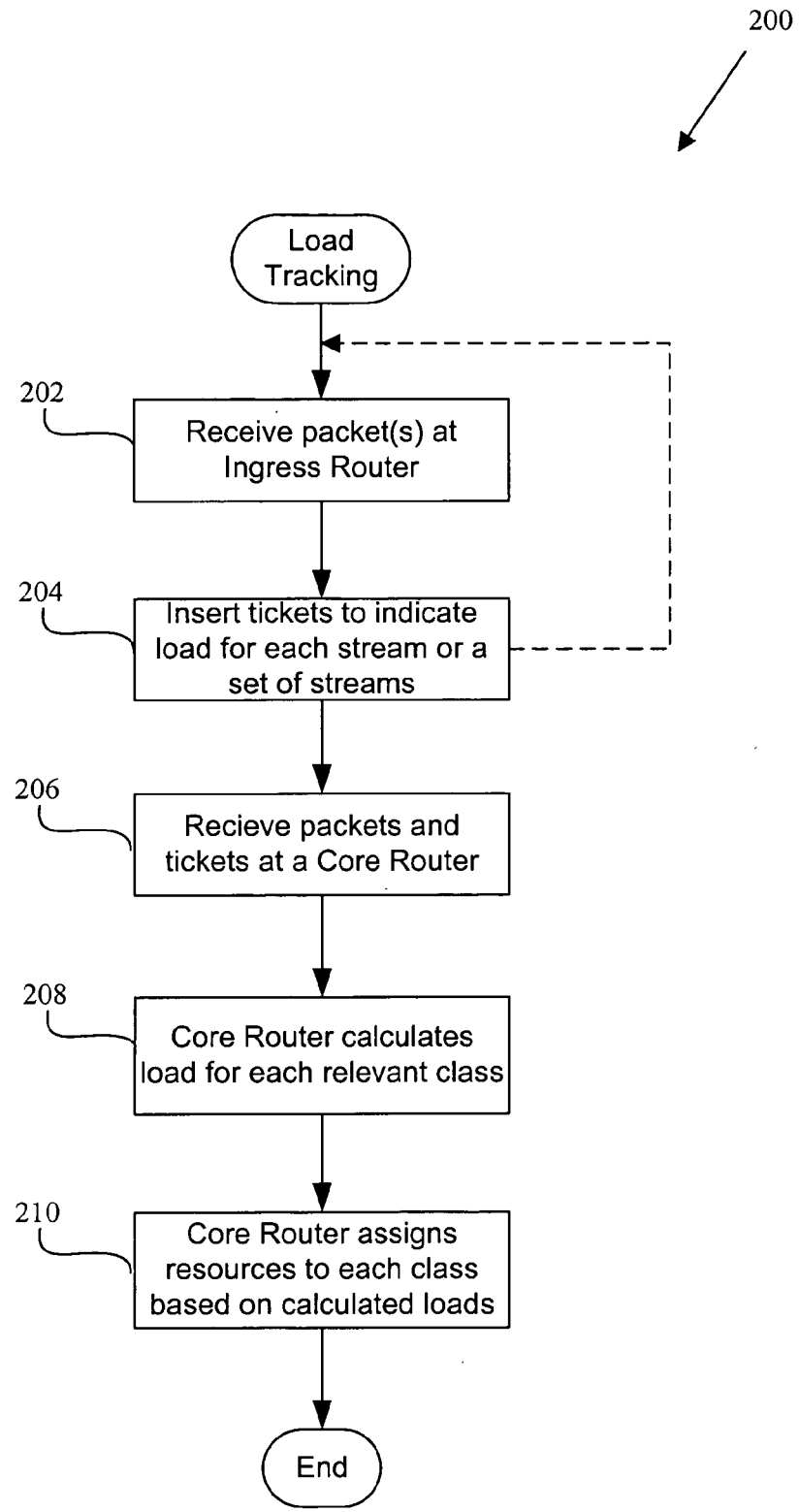
FIG. 2 is a flowchart illustrating a process for tracking load in accordance with one embodiment of the present invention.

FIG. 2 is a flowchart 200 illustrating a process for tracking load in accordance with one embodiment of the present invention. In operation 202, packets are received into an ingress router. Tickets to indicate load for each stream or a set of streams are then inserted in operation 204. Although shown as a linear process, packets may be continually received by ingress router and tickets may be continually inserted for the received packets.

Packets and tickets may then be received at a core router in operation 206. The core router then calculates load for each relevant class based on the received tickets in operation 208. The core router may utilize the inserted ticket in any suitable manner. For example, the core router may utilize the tickets to calculate the load for each relevant class, as indicated in operation 208. Alternatively, the core router may utilize the inserted tickets to calculate load for any suitable sub-set of classes.

In the illustrated embodiment, the core router then assigns resources to each class based on the calculated load in operation 210. Assignments may be performed in any suitable manner. For example, a particular bandwidth may be assigned to each stream within a given class. The streams of each class may have different bandwidth assignments. For example, each stream of the gold class may be allocated 5 megabytes per second, while each stream of the silver class may be allocated 3 megabytes per second. Any extra bandwidth may then be divided amongst the streams within each class. One embodiment of a resource allocation process is described below with reference to FIG. 4.

Figure 3A:
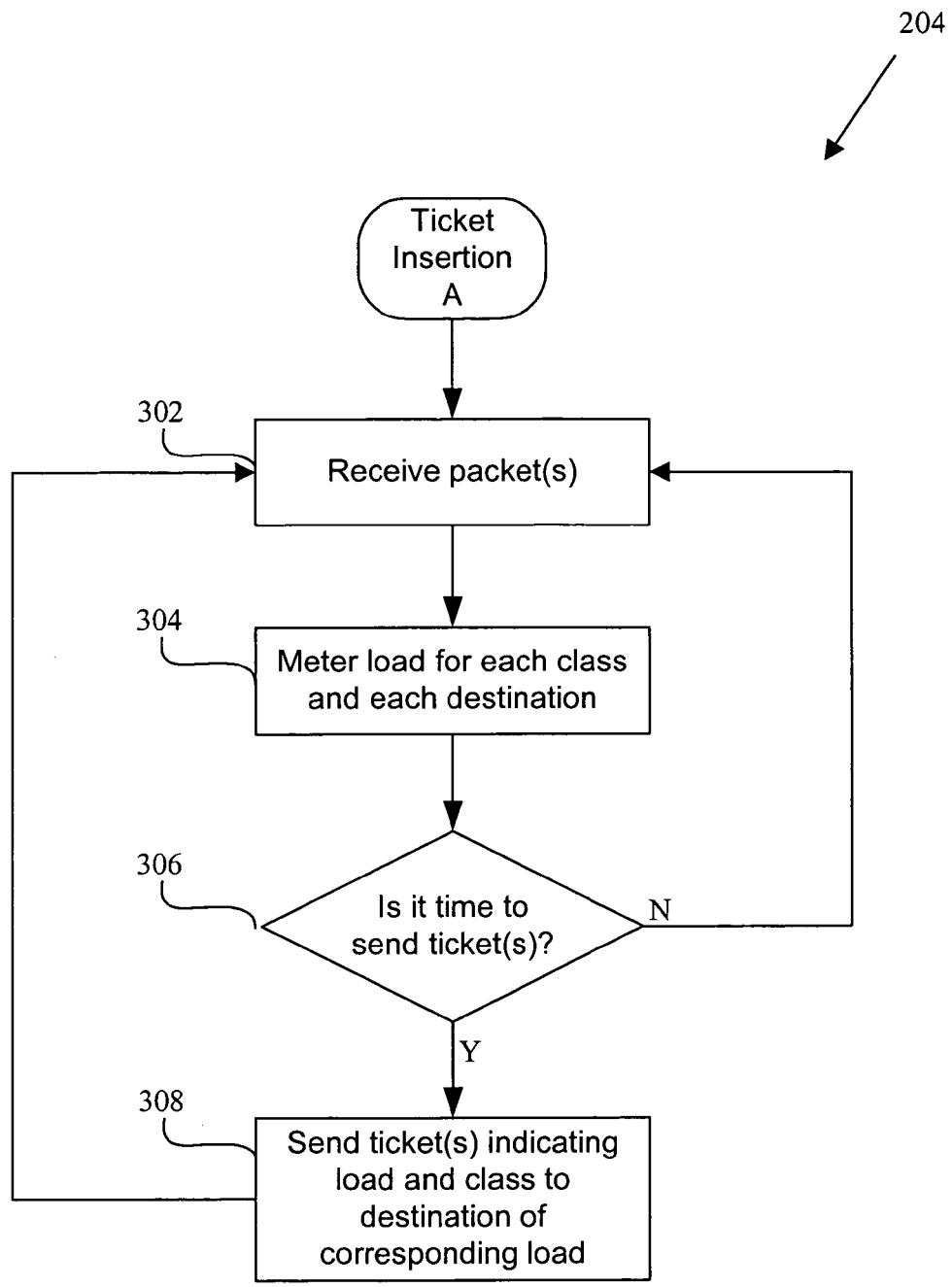
FIG. 3A is a flowchart illustrating the operation of FIG. 2 for inserting tickets in accordance with one embodiment of the present invention.

Tickets may be inserted in any suitable manner that provides relevant load information to the core routers. FIG. 3A is a flowchart illustrating the operation 204 of FIG. 2 for inserting tickets in accordance with one embodiment of the present invention. Initially, packets are received in operation 302. The load for each class and each destination is then metered in operation 304. Any suitable metering algorithm may be utilized.

It is then determined whether it is time to send a ticket in operation 306. Tickets may be sent after a predetermined time period or sent when the metered load for a particular class or a particular destination changes (as described below with reference to FIG. 3B). Any suitable factors may be utilized to determine when to send a ticket. For example, tickets should be sent at least as frequently as the core routers that utilize load information require updated load information. Additionally, the number of tickets may be limited to a number that will not tax or overwhelm the processing resources of a core router.

If it not time to send a packet, packets continue to be received in operation 302. If it is time to send a ticket, one or more tickets indicating load and class are then sent to the destination address of the corresponding load in operations 308. For example, a ticket is sent for each unit of load that reaches a particular destination. In one embodiment, one ticket is sent to the destination address of each stream. Each ticket also indicates the class that is associated with such stream.

Figure 3B:
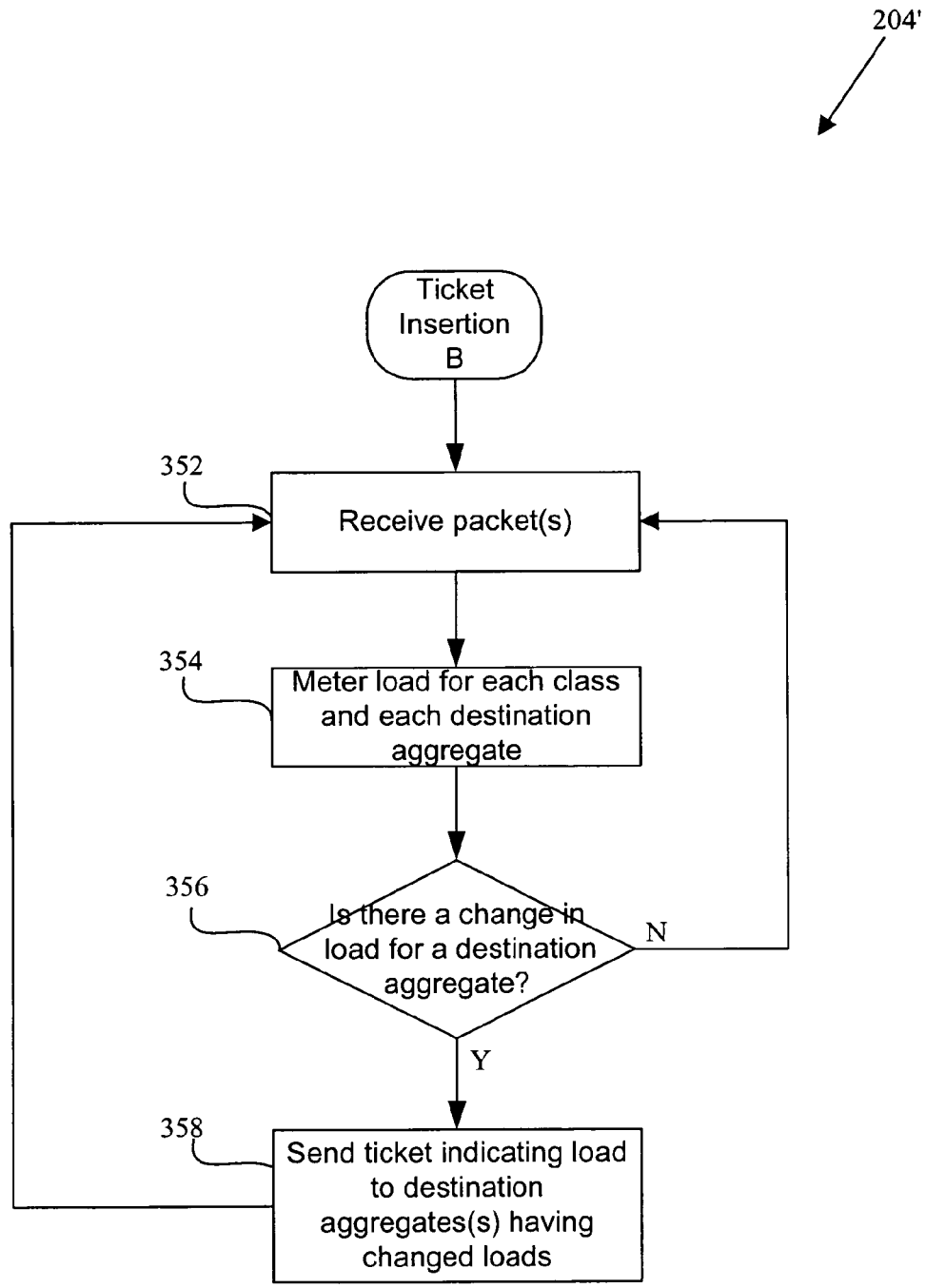
FIG. 3B is a flowchart illustrating an alternative process for inserting tickets in accordance with an alternative embodiment of the present invention.

FIG. 3B is a flowchart illustrating an alternative process 204' for inserting tickets in accordance with an alternative embodiment of the present invention. Initially, packets are received in operation 352. The load is then measured for each destination aggregate in operation 354. A destination aggregate is generally defined as a set of destinations, such as network 1 of FIG. 1. In this embodiment, the load merely has to be calculated for each destination aggregate, as compared to calculating the load for each stream destination. Of course, this process 204' may not be as accurate as the previously described process 204 of FIG. 3A.

It is then determined whether the load has changed for any of the destination aggregates in operation 356. For example, the number of streams to a particular destination aggregate and class has either decreased or increased since tickets were last sent for such class and destination aggregate. If there is a change via 358, a ticket indicating the load of the corresponding class is sent to the corresponding destination aggregate that has a changed load in operations 360. If there is not a change in the load values of a destination aggregate, packets continue to be received in operation 352.

The destination aggregate for a particular stream may be determined in any suitable manner. For example, a Border Gateway Protocol (BGP) route aggregate for a particular stream may be defined as the destination aggregate for that stream. Alternatively, a routing table may be compiled that matches the destination address of a particular stream with a destination aggregate, such as an egress edge router. More specifically, a concept referred to as "symmetry" is utilized to populate the routing table. When a packet of a particular stream is transmitted to a particular egress router, for example, a response from such egress router is typically sent back to the ingress router through which the stream originally entered the sub-network. Thus, the source address (e.g., destination aggregate or egress router address) of such response may be obtained and matched with the destination address of the particular stream.

In one embodiment, the processes for inserting a ticket (e.g., process 204 and 204' of FIGS. 3A and 3B) may be implemented by an ingress edge router. Of course, these processes may be implemented on any suitable router or processing node that observes load information for particular destination(s) and classes. Preferably, the number of streams flowing through such router is minimal, as compared to other routers, such that load calculation processing is minimized at the particular router. In the embodiment of FIG. 1, the ingress router 104 may be configured to calculate load for a class and destination (e.g., egress router 116 and 112) and then to send tickets to indicate such load to the corresponding destination (e.g., egress router 116 or 112).

Once a destination or destination aggregate receives load information for one or more classes, the destination or destination aggregate may then proceed to utilize this load information in any suitable manner. In the illustrated embodiment of FIG. 1, for each round the core router 108 may send a first amount of packets to core router 114 and a second amount of packets to core router 110 based on the amount of load flowing through core routers 114 and 110, as well as the assigned load. That is, packets that flow through core router 114 may belong to the gold class, while packets that flow through core router 110 belong to the bronze class. Thus, a higher number of packets for each stream are sent to core router 114 than to core router 110.

Figure 4:
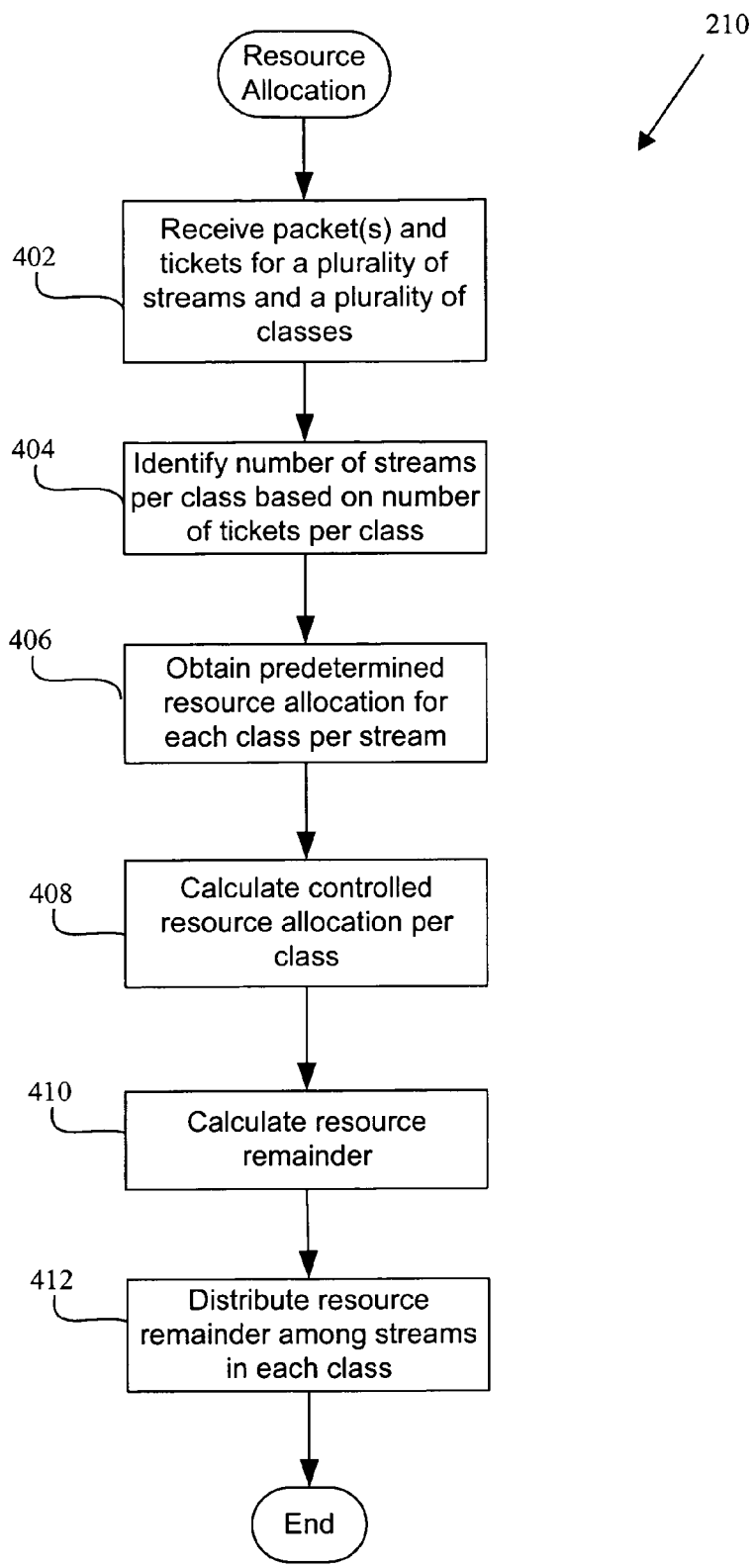
FIG. 4 is a flowchart illustrating a process for allocating resources in accordance with one embodiment of the present invention.

FIG. 4 is a flowchart illustrating a process 400 for allocating resources in accordance with one embodiment of the present invention. Initially, packets and tickets are received for a plurality of streams and a plurality of classes in operation 402. The number of streams are identified for each class based on the number of tickets received per class in operation 404.

A predetermined resource allocation value is obtained for each class and each stream in operation 406. In other words, each class may have a particular bandwidth assigned for each of its streams. For example, the gold class is initially allowed to transmit 5 packets per stream per round; the silver class is initially allowed to transmit 3 packets per stream per round; and the bronze class is initially allowed to transmit 2 packets per stream per round.

A controlled resource allocation value is then calculated per class in operation 408. For example, the predetermined resource allocation for a class is multiplied by the number of streams within that class. The resource remainder is then calculated its operation 410. The resource remainder is equal to the total available bandwidth minus the total control resource allocation for all of the classes. The resource remainder may then be distributed among the streams in each class in operation 412.

In the above example, let's suppose that the gold class currently has 3 streams; the silver class has 2 streams; and the bronze stream has 1 stream. The gold, silver, and bronze classes are initially allocated 5, 3, and 2 packets per stream per round, respectively. Thus, the total controlled resource allocation is 23 (3 gold streams×5 packets+2 silver streams×3+1 bronze stream×2). If the total available resources for each round is 50 packets, the remainder is 27 packets (50−23=27). The remainder of 27 packets may then be proportionately allocated among the streams within each class. For example, the gold class gets to transmit an extra 17 packets (15/(15+6+2)×27=17). That is, the total number of resources allocated to the gold stream (15) is divided by the sum of the resources allocated to all of the classes (15+6+2). The result represents the proportion of the total resources that are allocated to the gold class. This ratio (15) is multiplied with the remainder resources (27) to determine what portion of the remainder is to be allocated to the gold class. In other words, each class gets a fraction of the remainder, and that fraction is based on the proportion of resources that are initially being utilized by such class.

Generally, the techniques of the present invention for providing load information may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid load calculation system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the load calculation systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the load calculation system may be implemented on a general-purpose network host machine such as a personal computer or workstation. Further, the invention may be at least partially implemented on a card (e.g., an interface card) for a network device or a general-purpose computing device.

Figure 5:
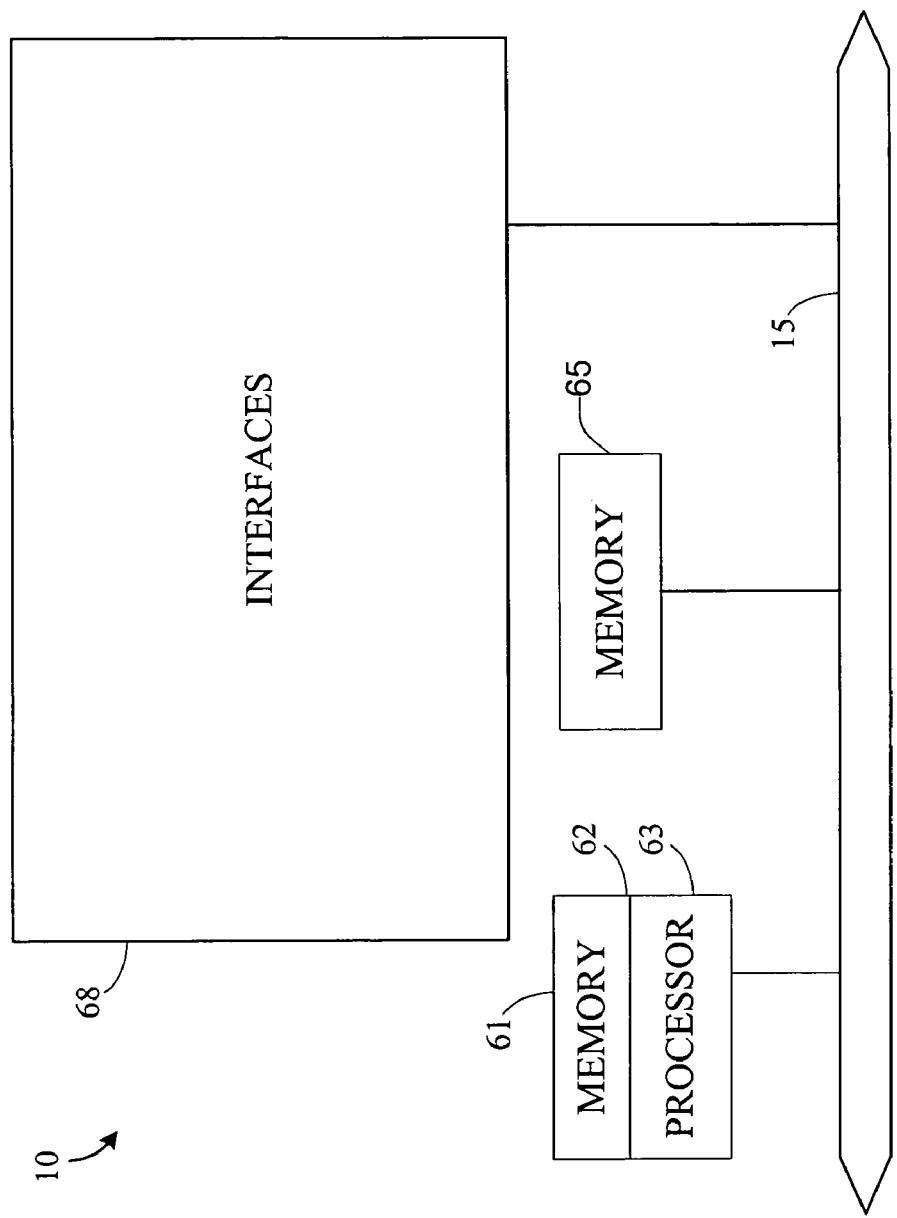
FIG. 5 is a diagrammatic representation of a router for implementing the process of FIGS. 3 and 4 in accordance with one embodiment of the present invention.

Referring now to FIG. 5, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for calculating load for each class and destination aggregate, sending one or more tickets to such destination aggregate, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or calculate load information and send tickets described herein. The program instructions may control the operation of an operating system and/or one or more applications, for example. The memory or memories may also be configured to store the load counts for each class and destination, and the tickets, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for providing load information within a network having a plurality of ingress routers, a plurality of core routers, and a plurality of egress routers, the method comprising:
   receiving a plurality of packets into a selected ingress router, each packet belonging to a selected one of a plurality of service classes and the packets being transmitted to a particular destination;
   metering a load value for each service class, the load value indicating a number count of streams for each service class; and
   periodically transmitting one or more tickets to the destination to indicate the load value for each of the one or more service classes, wherein the one or more tickets are configured to allow dynamic resource allocation between service classes on a per stream basis, wherein the resources are allocated by: calculating a total controlled resource allocation per class; calculating a resource remainder; and allocating the resource remainder to the streams of each class based on the calculated total controlled resources allocation for each class.

2. A method as recited in claim 1, wherein the destination is a selected one of the egress routers.

3. A method as recited in claim 1 wherein the one or more tickets indicate a total number of streams for each class that is being transmitted to the destination.

4. A method as recited in claim 3, wherein each ticket indicates a total number of streams for a particular class that are being transmitted to the destination.

5. A method as recited in claim 3 wherein each ticket indicates a single stream for a particular class that is being transmitted to the destination.

6. A method as recited in claim 3, wherein the tickets and the streams represented by the tickets are being transmitted to the same destination.

7. A method as recited in claim 1, wherein one or more tickets are only transmitted for a particular class when the load value has changed for such service class.

8. A method as recited in claim 1 wherein one or more tickets are transmitted after a predetermined amount of time.

9. A method as recited in claim 1 wherein the one or more tickets are sent to a selected core router and configured to allow the selected core router to dynamically allocate resources based on the current load of each class.

10. A method as recited in claim 9 wherein the tickets facilitate assured forward routing and differentiated services performed by the core router.

11. A router for providing load information within a network having a plurality of ingress routers, a plurality of core routers, and a plurality of egress routers, the router comprising:
    a memory; and
    a processor coupled to the memory,
    wherein at least one of the memory and the processor are adapted to provide:
    receiving a plurality of packets each packet belonging to a selected one of a plurality of service classes and the packets being transmitted to a particular destination;
    metering a load value for each service class, the load value indicating a number count of streams for each service class; and
    periodically transmitting one or more tickets to the destination to indicate the load value for each of the one or more service classes, wherein the one or more tickets are configured to allow dynamic resource allocation between service classes on a per stream basis, wherein the resources are allocated by: calculating a total controlled resource allocation per class; calculating a resource remainder; and allocating the resource remainder to the streams of each class based on the calculated total controlled resources allocation for each class.

12. A router as recited in claim 11, wherein the destination is a selected one of the egress routers.

13. A router as recited in claim 11 wherein the one or more tickets indicate a total number of streams for each class that is being transmitted to the destination.

14. A router as recited in claim 13, wherein each ticket indicates a total number of streams for a particular class that are be transmitted to the destination.

15. A router as recited in claim 13 wherein each ticket indicates a single stream for a particular class that is being transmitted to the destination.

16. A router as recited in claim 13, wherein the tickets and the streams represented by the tickets are being transmitted to the same destination.

17. A router as recited in claim 11, wherein one or more tickets are only transmitted for a particular class when the load value has changed for such service class.

18. A router as recited in claim 11 wherein one or more tickets are transmitted after a predetermined amount of time.

19. A router as recited in claim 11 wherein the one or more tickets are sent to a selected core router and configured to allow the selected core router to dynamically allocate resources based on the current load of each class.

20. A router as recited in claim 19 wherein the tickets facilitate assured forward routing and differentiated services performed by the core router.

21. A computer readable medium containing programming instructions for providing load information within a network having a plurality of ingress routers, a plurality of core routers, and a plurality of egress routers, the computer readable medium comprising:
    computer code for receiving a plurality of packets into a selected ingress router, each packet belonging to a selected one of a plurality of service classes and the packets being transmitted to a particular destination;

computer code for metering a load value for each service class, the load value indicating a number count of steams for each service class; and computer code for periodically transmitting one or more tickets to the destination to indicate the load value for each of the one or more service classes, wherein the one or more tickets are configured to allow dynamic resource allocation between service classes on a per stream basis, wherein the resources are allocated by: calculating a total controlled resource allocation per class; calculating a resource remainder; and allocating the resource remainder to the streams of each class based on the calculated total controlled resources allocation for each class.

22. A method for allocating resource to one or more data streams within a network having a plurality of ingress routers, a plurality of core routers, and a plurality of egress routers, the method comprising:

receiving one or more tickets into a selected core router, the tickets indicating a total load for each one of a plurality of service classes, the total load indicating a total number count of streams for each one of the plurality of service classes; and dynamically allocating resources between the streams of different service classes based on the one or more received tickets, wherein the resources are allocated by: calculating a total controlled resource allocation per class; calculating a resource remainder; and allocating the resource remainder to the streams of each class based on the calculated total controlled resources allocation for each class.

23. A method as recited in claim 22, wherein the tickets indicate the total number of streams being transmitted to the selected core router for each class.

24. A method or allocating resource to one or more data steams within a network having a plurality of ingress routers, a plurality of core routers, and a plurality of egress routers, the method comprising:

receiving one or more tickets into a selected core router, the tickets indicating a total load for each one of a plurality of service classes; and dynamically allocating resources to a plurality of streams within each service class based on the one or more received tickets, wherein the resources are allocated by:

calculating a total controlled resource allocation per class;

calculating a resource remainder, and allocating the resource remainder to the steams of each class based on the calculated total controlled resource allocation for each class.

25. A method as recited in claim 24, wherein the total controlled resource allocation for a particular class is equal to an assigned resource allocation for each stream within the particular class times a total number of streams within the particular class and the resource remainder is equal to a total available bandwidth minus the total controlled resource allocation for all of the classes.

26. A method as recited in claim 24, wherein a portion of the resource remainder is allocated to a particular class and the portion is proportionate to a ratio of the total controlled resource allocation for the particular class divided by the total controlled resource allocation for all classes.

27. A router for allocating resource to one or more data streams within a network laving a plurality of ingress routers, a plurality of core routers, and a plurality of egress routers, the router comprising:

a memory; and a processor coupled to the memory, wherein at least one of the memory and the processor are adapted to provide:

receiving one or more tickets into the router, the tickets indicating a total load for each one of a plurality of service classes, the total load indicating a total number count of streams for each one of the plurality of service classes; and dynamically allocating resources between the streams of different service classes based on the one or more received tickets, wherein the resources are allocated by: calculating a total controlled resource allocation per class; calculating a resource remainder; and allocating the resource remainder to the streams of each class based on the calculated total controlled resources allocation for each class.

28. A computer readable medium containing programming instructions for allocating resource to one or more data streams within a network having a plurality of ingress routers, a plurality of core routers, and a plurality of egress routers, the computer readable medium comprising:

computer code for receiving one or more tickets into a selected core router, the tickets indicating a total load for each one of a plurality of service classes, the total load indicating a total number count of steams for each one of the plurality of service classes; and computer code for dynamically allocating resources between the streams of different service classes based on the one or more received tickets, wherein the resources are allocated by: calculating a total controlled resource allocation per class; calculating a resource remainder; and allocating the resource remainder to the streams of each class based on the calculated total controlled resources allocation for each class.

29. A computer readable medium as recited in claim 21, wherein the destination is a selected one of the egress routers.

30. A computer readable medium as recited in claim 21, wherein the one or more tickets indicate a total number of streams for each class that is being transmitted to the destination.

31. A computer readable medium as recited in claim 30, wherein each ticket indicates a total number of streams for a particular class that are being transmitted to the destination.

32. A computer readable medium as recited in claim 30, wherein each ticket indicates a single stream for a particular class that is being transmitted to the destination.

33. A computer readable medium as recited in claim 30, wherein the tickets and the streams represented by the tickets are being transmitted to the same destination.

34. A computer readable medium as recited in claim 21, wherein one or more tickets are only transmitted for a particular class when the load value has changed for such service class.

35. A computer readable medium as recited in claim 21, wherein one or more tickets are transmitted after a predetermined amount of time.

36. A computer readable medium as recited in claim 21, wherein the one or more tickets are sent to a selected core router and configured to allow the selected core router to dynamically allocate resources based on the current load of each class.

37. A computer readable medium as recited in claim 36, wherein the tickets facilitate assured forward routing and differentiated services performed by the core router.

38. A router as recited in claim 27, wherein the tickets indicate the total number of steams being transmitted to the selected core router for each class.

39. A router for allocating resource to one or more data streams within a network having a plurality of ingress routers, a plurality of core routers, and a plurality of egress routers, the router comprising:
- a memory; and
- a processor coupled to the memory,
- wherein at least one of the memory and the processor are adapted to provide:
  - receiving one or more tickets into the router, the tickets indicating a total load for each one of a plurality of service classes, the total load corresponding to a total number of streams for each one of the plurality of service classes; and
  - dynamically allocating resources to a plurality of streams within each service class based on the one or more received tickets, wherein the resources are allocated by:
  - calculating a total controlled resource allocation per class;
  - calculating a resource remainder; and
  - allocating the resource remainder to the streams of each class based on the calculated total controlled resource allocation for the each class.

40. A router as recited in claim 39, wherein the total controlled resource allocation on for a particular class is equal to assigned resource allocation for each stream within the particular class times the total number of streams within the particular class and the resource remainder is equal to a total available bandwidth minus the total controlled resource allocation for all of the classes.

41. A router as recited in claim 39, wherein a portion of the resource remainder is allocated to a particular class and the portion is proportionate to a ratio of the total controlled resource allocation for the particular class divided by the total controlled resource allocation for all classes.

42. A computer readable medium as recited in claim 28, wherein the tickets indicate the total number of streams being transmitted to the selected core router for each class.

43. A computer readable medium containing programming instructions for allocating resource to one or more data streams within a network having a plurality of ingress routers, a plurality of core routers, and a plurality of egress routers, the computer readable medium comprising:
- computer code for receiving one or more tickets into a selected core router, the tickets indicating a total load for each one of a plurality of service classes, the total load corresponding to a total number of steams for each one of the plurality of service classes; and
- computer code for dynamically allocating resources to a plurality of streams within each service class based on the one or more received tickets, wherein the resources are allocated by;
- calculating a total controlled resource allocation per class;
- calculating a resource remainder; and
- allocating the resource remainder to the streams of each class based on the calculated total controlled resource allocation for the each class.

44. A computer readable medium as recited in claim 43, wherein the total controlled resource allocation for a particular class is equal to an assigned resource allocation for each steam within the particular class times the total number of streams within the particular class and the resource remainder is equal to a total available bandwidth minus the total controlled resource allocation for all of the classes.

45. A computer readable medium as recited in claim 43, wherein a portion of the resource remainder is allocated to a particular class and the portion is proportionate to a ratio of the total controlled resource allocation for the particular class divided by the total controlled resource allocation for all classes.

46. An apparatus for providing load information within a network having a plurality of ingress routers, a plurality of core routers, and a plurality of egress routers; the apparatus comprising:
- means for receiving a plurality of packets into a selected ingress router, each packet belonging to a selected one of a plurality of service classes and the packets being transmitted to a particular destination;
- means for metering a load value for each service class, the load value indicating a number count of steams for each service class; and
- means for periodically transmitting one or more tickets to the destination to indicate the load value for each of the one or more service classes, wherein the one or more tickets are configured to allow dynamic resource allocation between service classes on a per stream basis, wherein the resources are allocated by: calculating a total controlled resource allocation per class; calculating a resource remainder; and allocating the resource remainder to the streams of each class based on the calculated total controlled resources allocation for each class.

47. An apparatus for allocating resource to one or more data streams within a network having a plurality of ingress routers, a plurality of core routers, and a plurality of egress routers, the apparatus comprising:
- means for receiving one or more tickets into a selected core router, the tickets indicating a total load for each one of a plurality of service classes; and
- means for dynamically allocating resources to a plurality of streams within each service class based on the one or more received tickets, wherein the resources are allocated by:
- calculating a total controlled resource allocation per class;
- calculating a resource remainder; and
- allocating the resource remainder to the streams of each class based on the calculated total controlled resource allocation for the each class.

* * * * *